Sept. 8, 1964  J. R. BEATTIE  3,147,554
ULLAGE ROD
Filed Aug. 29, 1962

JACKSON R. BEATTIE
INVENTOR

BY

ATTORNEYS 3,147,554
ULLAGE ROD
Jackson R. Beattie, Trenton, Mich., assignor to Ford Motor Company, Dearborn, Mich., a corporation of Delaware
Filed Aug. 29, 1962, Ser. No. 220,270
6 Claims. (Cl. 33—126.7)

This invention relates to a ullage rod and more particularly to an improved ullage rod for determining the liquid level in the sump of an internal combustion engine.

Frequently, a liquid sump is located in a relatively inaccessible position requiring the provision of a ullage rod of substantial length to permit convenient determination of the liquid level. The engine of a motor vehicle is a typical example of installation that requires an elongated ullage rod. In a motor vehicle the lubricant sump of the engine is located considerably below the hood opening of the engine compartment.

It is common practice to secure a closure member for the opening in the sump to the ullage rod. The closure member is furnished to preclude the entry of foreign material into the sump when the rod is inserted. The closure member is normally secured to the rod through deformation of the rod in some manner. Frequently, the rod is crimped adjacent each side of the closure member to fix the closure member relative to the rod.

When an elongated ullage rod is utilized, as in the case of motor vehicles, the rod is subjected to considerable flexure during insertion and removal of the rod. The rod is also subjected to fatigue loading from the engine vibrations. In the type ullage rod described, failures frequently occur in the rod at the point where the closure member is secured since this is the point of greatest stress concentration.

It is, therefore, a principal object of this invention to provide an improved ullage rod that is resistant to fatigue failures.

It is a further object of this invention to provide an improved manner of securing a closure member to a ullage rod.

A ullage rod incorporating this invention comprises an elongated blade adapted to extend through an aperture in a wall of a liquid sump with the lower end of the blade terminating below the normal liquid level in the sump. The upper end of the blade is received in a tubular retaining member having an internal diameter substantially equal to the width of the contained end of the blade. The blade and tubular member are secured relative to each other by deforming them into the shape of a handle.

Further objects and advantages of this invention will become more apparent as this description proceeds particularly when considered in conjunction with the accompanying drawings, wherein.

Figure 1:
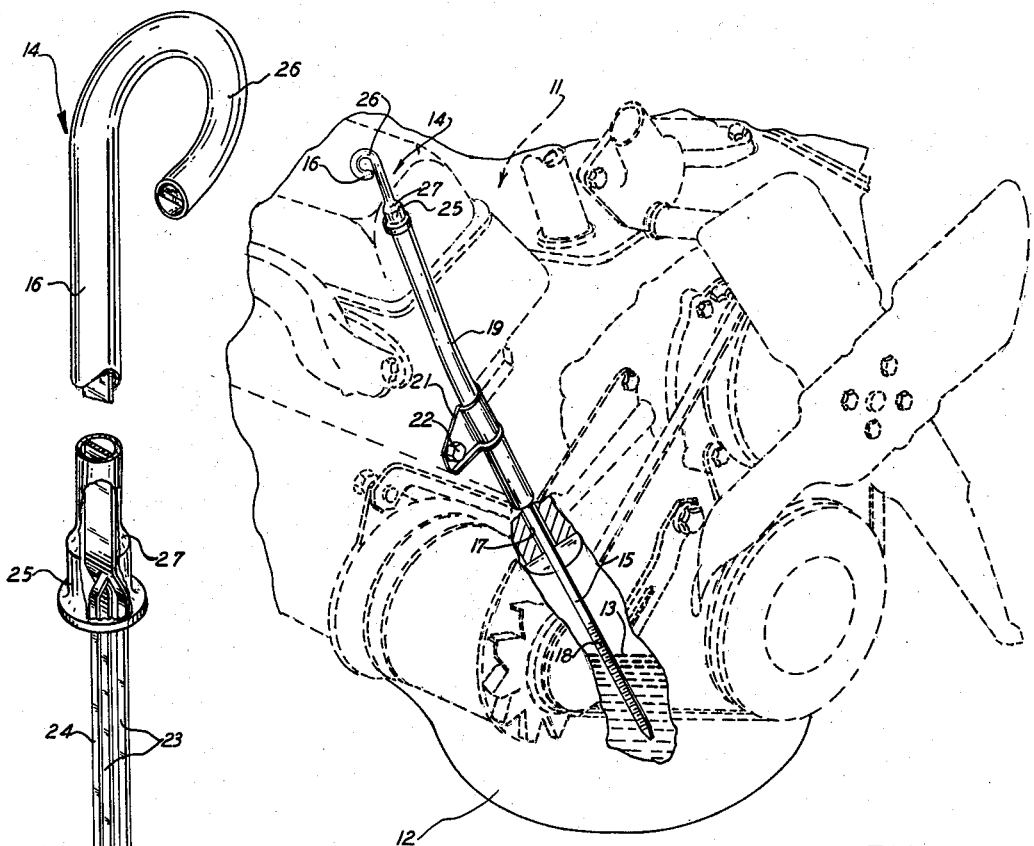
FIGURE 1 is a perspective view of a portion of an internal combustion engine incorporating this invention.

Referring in detail to the illustrated embodiment of the invention, an internal combustion engine particularly adapted for use in a motor vehicle is indicated generally at 11. An oil sump or crankcase 12 is secured to the engine 11 in a known manner. The normal level of the lubricating oil in the crankcase 12 is indicated by the reference numeral 13.

A ullage rod or dipstick is identified by the reference numeral 14. The ullage rod comprises an elongated thin gage sheet metal blade 15 and a tubular retaining member 16. The blade 15 extends through an aperture 17 formed in one of the engine walls that surrounds the crankcase 12 and has its lower end immersed below the normal level of the lubricant in the crankcase 12. The lower end of the blade is provided with indicia 18 to facilitate reading of the level of the lubricant in the crankcase 12.

The blade 15 extends a considerable distance above the engine wall through which it passes. The elongation facilitates insertion and removal from the exterior of a vehicle body in which the engine 11 may be placed. A tubular projection 19 is secured to the engine 11 by a C clamp 21 and threaded fastener 22 to provide support for the upper end of the blade 15. The tubular projection 19 terminates adjacent the outer end of the wall in which the aperture 17 is formed and extends to a point contiguous to the upper end of the ullage rod.

Adjacent the upper end of the tubular projection 19 the blade 15 is provided with offset portions 23 and 24. The offset portions 23 and 24 snugly engage the inner surface of the upper end of the tubular projection 19 to retain the ullage rod 14 therein. The tubular retaining member 16 is swaged at its lower end to an increased diameter portion 25 having an internal diameter substantially the same as the external diameter of the outer end of the tubular projection 19. When the ullage rod 14 is inserted into the sump 12, the increased diameter portion 25 of the tubular retaining member 16 snugly engages the exterior of the tubular projection 19.

Figure 2:
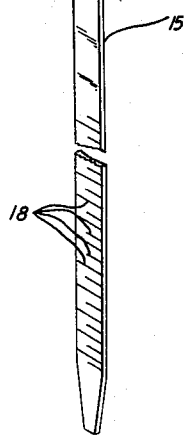
FIGURE 2 is an enlarged perspective view with portions broken away of the ullage rod shown in FIGURE 1.

As may be seen in FIGURE 2, the upper end of the blade 15 extends into the tubular retaining member 16 for a considerable distance. The tubular retaining member 16 has an internal diameter that is substantially the same as the width of the contained portion of the blade 15. The blade 15 is secured relative to the tubular retaining member 16 by deforming the terminal portion of the retaining member 16 and the contained portion of the blade 15 into the shape of a handle, indicated at 26. By deforming the blade 15 and the retaining member 16 through an arc of greater than 90 degrees, in this case nearly 360 degrees, the elements are secured together without requiring any other means for fastening. The fastening is also accomplished without increasing the stresses upon the blade 15 in any manner. The radius of the arcuate handle portion 26 substantially exceeds the external diameter of the tubular retaining member 16.

The dipstick assembly described may be constructed conveniently in the following manner: The blade 15 is first formed with the offset portions 23 and 24. The tubular retaining member 16, which is initially a straight piece of tubular steel, is swaged to form the portion 25. The tubular retaining member 16 is then slid over the blade 15 until a flange 27 connecting the swagged portion 25 with the remainder of the retaining member contacts the upper end of the offset portions 23 and 24. The upper end of the tubular retaining members 16 and the contained portion of the blade 15 are then bent into the shape of a handle. This secures the elements relative to each other.

If desired, a felt washer (not shown) may be positioned around the upper end of the blade 15 to sealingly engage the upper end of the tubular projection 19. Alternatively, the exposed end of the tubular retaining member 16 may be sealed by a plug of some type (not shown). In most instances, however, the curvature of the handle 26 will of itself preclude the entry of foreign matter into the crankcase 12 through the tubular projection 19.

It is to be understood that this invention is not limited to the construction shown and described. Obviously, the invention is not limited to the use of a dipstick for internal combustion engine crankcases, but could be utilized with equal facility with any other form of liquid containing sump. Other changes and modifications may be made without departing from the spirit and scope of the invention, as defined by the appended claims.

I claim:
1. A ullage rod for a liquid sump comprising an elongated blade adapted to extend through a wall of the sump with the lower end of said blade terminating below the normal liquid level in the sump and a tubular member having an internal dimension substantially equal to the width of the upper end of said blade, said blade being received in and secured relative to said tubular member by deformation of said tubular member and the upper end of said blade into the shape of a handle.

2. A ullage rod for a liquid sump comprising an elongated blade adapted to extend through a wall of the sump with the lower end of said blade terminating below the normal liquid level in the sump and a tubular retaining member for said blade, said tubular retaining member having a portion of substantial length receiving the upper end of said blade, said portion having an internal diameter substantially equal to the width of the contained part of said blade, said blade being secured relative to said tubular retaining member by deformation of said portion of said tubular retaining member and the contained part of said blade through an angle of at least 90 degrees into the shape of a handle.

3. A ullage rod for a liquid sump comprising an elongated blade adapted to extend through a wall of the sump with the lower end of said blade terminating below the normal liquid level in the sump and a tubular retaining member for said blade, said tubular retaining member having a portion of substantial length receiving the upper end of said blade, said portion having an internal dimension substantially equal to the width of the contained part of said blade, said blade being secured relative to said retaining member by deformation of said portion of said tubular retaining member and the contained part of said blade into the shape of a handle having an arcuate configuration having a radius substantially in excess of the external dimension of said tubular retaining member.

4. In combination, a liquid retaining sump, said sump having an opening in an upper wall thereof terminating in a tubular projection, a ullage rod for said sump comprising an elongated blade adapted to extend through said tubular projection with the lower end of said blade terminating below the normal liquid level in said sump, said blade when received in said sump having an upper end that terminates above the outer end of said tubular projection, and a tubular retaining member receiving the upper end of said blade, said retaining member having a first part having an internal dimension at least equal to the width of the contained part of said blade and a second part having an internal dimension substantially equal to the external dimension of the outer end of said tubular projection, said blade being secured relative to said retaining member by deformation of the first part of said retaining member and the contained part of said blade into the shape of the handle.

5. In combination, a liquid retaining sump, said sump having an opening in an upper wall thereof terminating in a tubular projection, a ullage rod for said sump comprising an elongated blade adapted to extend through said tubular projection with the lower end of said blade terminating below the normal liquid level in said sump, said blade when received in said sump having an upper end that terminates above the outer end of said tubular projection, and a tubular retaining member receiving the upper end of said blade, said retaining member having a first part having an internal dimension at least equal to the width of the contained part of said blade and a second part having an internal dimension substantially equal to the external dimension of the upper end of said tubular projection, said blade being secured relative to said retaining member by deformation of said first part of said retaining member and the contained part of said blade through an angle of at least 90 degrees into the shape of a handle.

6. In combination, a liquid retaining sump, said sump having an opening in an upper wall thereof terminating in a tubular projection, a ullage rod for said sump comprising an elongated blade adapted to extend through said tubular projection with the lower end of said blade terminating below the normal liquid level in said sump, said blade when received in said sump having an upper end that terminates above the outer end of said tubular projection, and a tubular retaining member receiving the upper end of said blade, said retaining member having a first part having an internal dimension at least equal to the width of the contained part of said blade and a second part having an internal dimension substantially equal to the external dimension of the upper end of said tubular projection, said blade being secured relative to said retaining member by deformation of said first part of said retaining member and the contained part of said blade into the shape of a handle having an arcuate configuration of radius substantially in excess of the external dimension of said retaining member.

No references cited.